Figure 1:
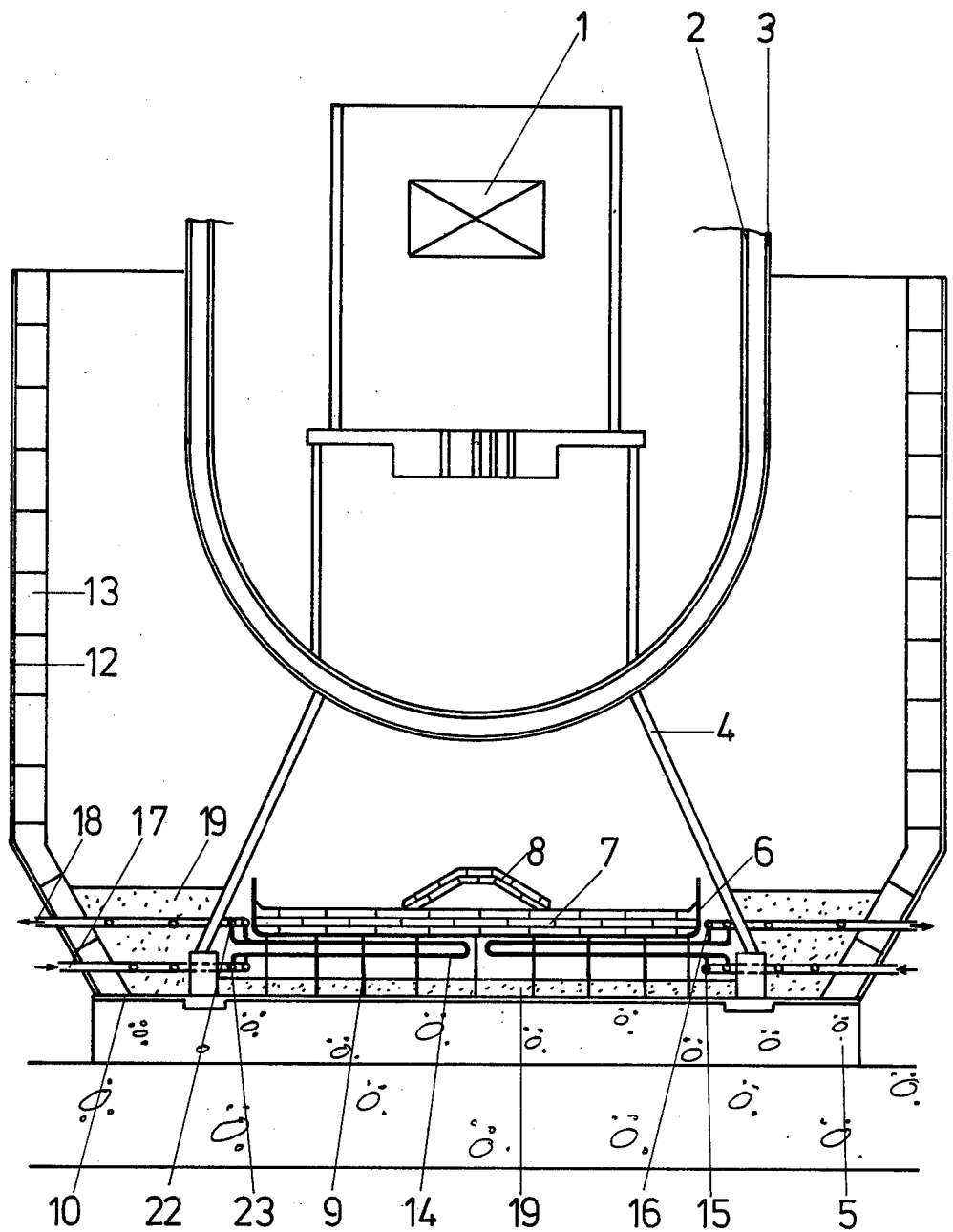

United States Patent [19]

Friedrich

[11] 4,072,561
[45] Feb. 7, 1978

[54] BOTTOM COOLER FOR NUCLEAR REACTORS

[75] Inventor: Hans-Jürgen Friedrich, Forsbach, Germany

[73] Assignee: Interatom, Internationale Atomreaktorbau GmbH, Bensberg, Cologne, Germany

[21] Appl. No.: 709,306

[22] Filed: July 28, 1976

[30] Foreign Application Priority Data

Aug. 11, 1975 Germany .............................. 2535729

[51] Int. Cl.² .............................................. G21C 9/00
[52] U.S. Cl. ........................................ 176/38; 176/40
[58] Field of Search ....................... 176/37, 38, 40, 87

[56] References Cited

U.S. PATENT DOCUMENTS

| | | | |
|---|---|---|---|
| 3,607,630 | 9/1971 | West ........................................ | 176/38 |
| 3,677,892 | 7/1972 | Schabert ................................. | 176/37 |
| 3,702,802 | 11/1972 | Jansen, Jr. ............................... | 176/38 |
| 3,719,556 | 3/1973 | Snyder, Jr. et al. .................... | 176/38 |
| 3,964,966 | 6/1976 | Lampe ..................................... | 176/38 |

FOREIGN PATENT DOCUMENTS 2,363,845  6/1975  Germany .............................. 176/38

*Primary Examiner*—Samuel W. Engle
*Assistant Examiner*—Ralph Palo
*Attorney, Agent, or Firm*—Herbert L. Lerner

[57] ABSTRACT

A cooler for a bottom tray of a liquid metal-cooled nuclear reactor, the tray serving as a receptacle for a melting reactor core in the event of a hypothetical accident, comprising coolant distribution and collecting pipes disposed below the bottom tray about the circumference thereof, and a plurality of parallel tubes connecting said distribution and collecting pipes, said tubes being in the shape of involutes running between the center and circumference of said tray.

7 Claims, 4 Drawing Figures

BOTTOM COOLER FOR NUCLEAR REACTORS

The invention relates to a cooling facility for the bottom tray of a liquid metal-cooled nuclear reactor, which is to receive the melting reactor core in the event of a hypothetical accident. In such a case, the melted fuel is first to be distributed through a central cone in a tray of highly heat-resistant material in such a manner that it cannot form a critical mass. Since the fuel continues to liberate heat, a suitable cooling facility is necessary to ensure that the fuel does not melt through the bottom tray. This cooling facility must not only safely remove the heat, which is likely to be distributed very unevenly, but must also ensure that the bottom tray is not damaged by thermal stresses, and that the concrete structure underneath this bottom tray does not become excessively heated. Since this cooling facility is no longer accessible after the reactor is put into operation, or can be reached only at great expense, it must be constructed in a redundant manner, so that leaks or the clogging of individual pipes cannot lead to the failure of the entire facility.

It is therefore an object of the present invention to provide a cooler for the bottom tray of a sodium-cooled breeder reactor which has a temperature profile that is approximately uniform over the circumference and continuous in the radial direction.

With the foregoing and other objects in view, there is provided in accordance with the invention, a cooler for a bottom tray of a liquid metal-cooled nuclear reactor, the tray serving as a receptacle for a melting reactor core in the event of a hypothetical accident, comprising coolant distribution and collecting pipes disposed below the bottom tray about the circumference thereof, and a plurality of parallel tubes connecting the distribution and collecting pipes, the tubes being in the shape of involutes running between the center and circumference of the tray. These are connected with each other in the shape of involutes. Since these parallel-connected tubes, which are bent in the shape of involutes, can all be of equal length, they must all have the same pressure loss and can therefore also remove the same amount of heat. This can be done without any special or differently adjustable throttling devices. Because of the involute-shaped structure, adjacent cooling tubes always have constant spacings from each other, so that no appreciable temperature differences can occur in the circumferential direction. In the radial direction, a profile of temperatures which gradually decreases toward the inside is obtained. This radial temperature gradient produces desirable radial tensile stresses in the bottom tray, which counteract any deformation of the tray bottom caused by vertical temperature gradients. For reasons of geometry, a small circular area occurs under the center of the bottom tray with the involute-shaped structure of the cooling tubes, through which no cooling tubes pass. However, since the center of such a bottom tray is protected by a separate cone of highly heat-resistant material, the cooling can be neglected in this small area.

In accordance with another feature of the invention, the distribution and collecting pipes are ring-shaped, the distribution pipe being in a plane below the collecting pipe, the tubes being disposed in a lower plane between the distribution pipe and the center and in an upper plane between the center and the collecting pipe. The cooling medium thus enters at a low temperature and limits the temperature of the concrete structure below the bottom tray to a value permissible for this concrete.

In accordance with a further feature of the invention, the return lines of the tubes between the center and collecting pipe are positioned above a corresponding feed line between the distribution pipe and the center. This structure facilitates the installation of the pre-bent hairpin tubes and provides like involute-shaped spaces between the individual tubes in which suitably formed support members for the bottom tray can be placed.

In accordance with an added feature of the invention, at least two separate collecting pipes and two separate distribution pipes are included, the tubes being connected between associated pairs of collecting and distribution pipes in two parallel systems, the respective tubes of each system being alternately disposed about the circumference. Since adjacent tubes which alternate at the circumference belong to separate cooling systems, the removal of heat is ensured without the permissible temperatures and temperature differences being exceeded even if one cooling system fails. It is assumed that where two separate systems are present, one would be sufficient to remove the heat.

In accordance with an additional feature of the invention, separate supply and discharge lines are respectively connected to the two separate collecting and distribution systems, the supply and discharge lines being respectively disposed in alternating spiral paths outside the circumference of the tray.

In accordance with a concomitant feature of the invention, the tubes are hollow and of smaller diameter than the pipes.

In accordance with still another feature of the invention, support members are disposed in spaces between adjacent tubes.

Other features which are considered characteristic for the invention are set forth in the appended claims.

Although the invention is illustrated and described herein as embodied in a bottom cooler for nuclear reactors, it is nevertheless not intended to be limited to the details shown, since various modifications may be made therein without departing from the spirit of the invention and within the scope and range of equivalents of the claims.

Figure 2:
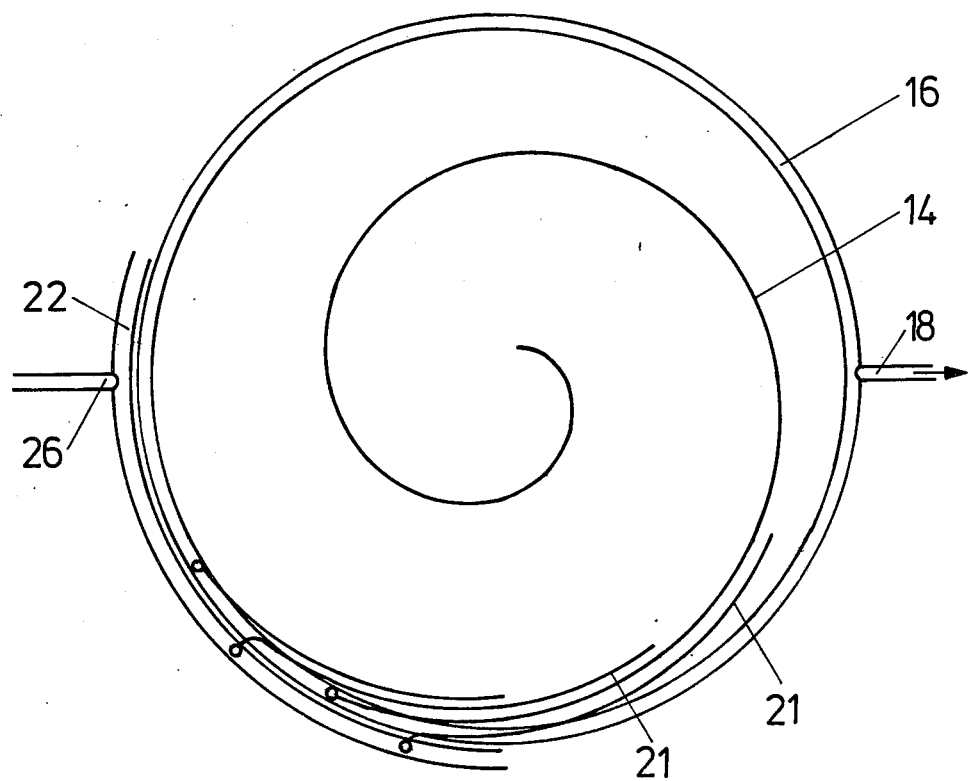
Figure 3:
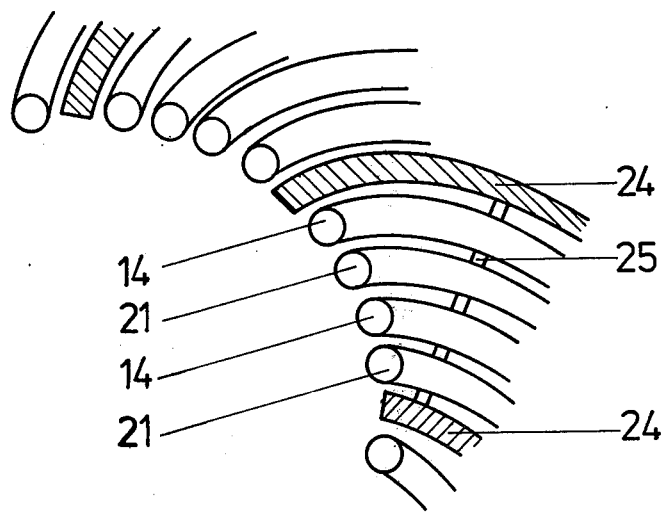
Figure 4:
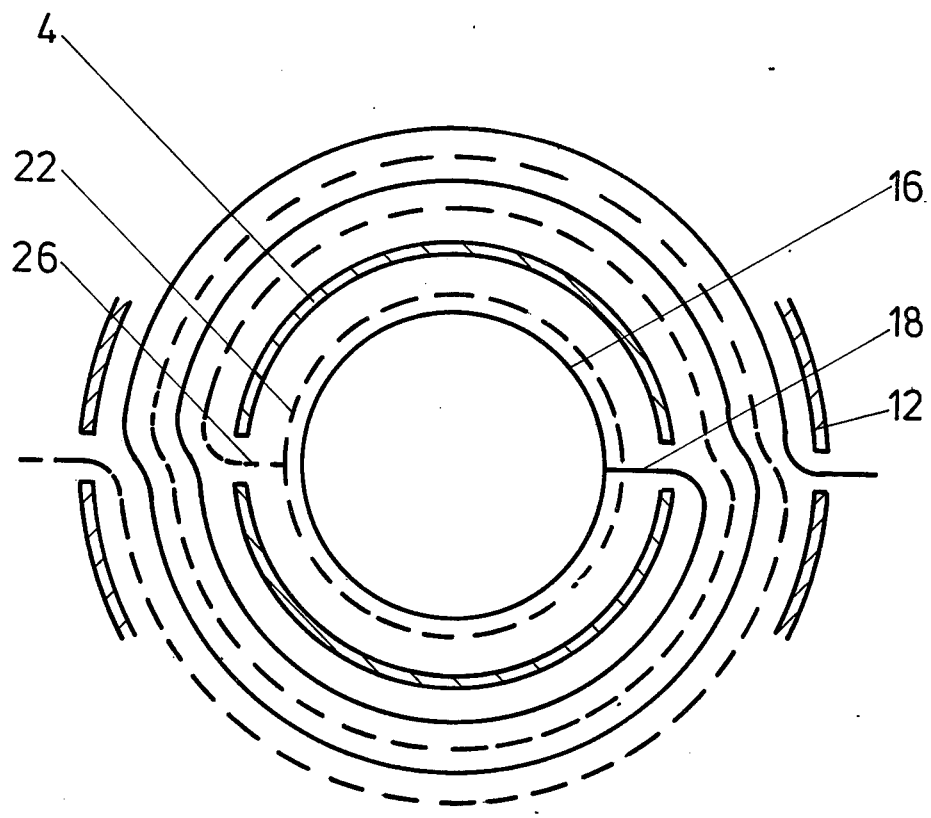

The invention, however, together with additional objects and advantages thereof will be best understood from the following description when read in connection with the accompanying drawings, in which:

FIG. 1 is a diagrammatic view showing a vertical cross section through the reactor including the bottom tray and the cooler, FIG. 2 is a diagrammatic plan view showing the involute-shaped arrangement of several cooling tubes with connections to the ring-shaped collecting and distribution pipes, FIG. 3 is an enlarged partial view taken from the center of the cooling facility showing a horizontal cross section through the U-shaped ends of the hairpin tubes, and FIG. 4 is another diagrammatic plan view showing the feed and discharge lines for distribution and collecting pipes of the cooler.

As shown in FIG. 1, the reactor core 1 of a sodium-cooled fast breeder reactor of about 2000 MW is disposed in a reactor vessel 2 which is contained in a double tank 3 supported on a conical support 4 by a concrete foundation 5. Inside the conical support 4 is a metalic bottom tray 6 which is lined with a highly temperature-resistant material 7 and which has a flat cone 8 in the center that is also of a highly temperature-resistant material. In the event of a hypothetical accident, the reactor core 1, which is melting through the reactor vessel 2 and the double tank 3, is distributed by this material over the bottom tray 6 in such a manner that no critical mass of fission material, in the nuclear sense, is formed. The bottom tray 6 is supported by numerous metallic cross members 9, which rest on a like metallic bottom 10 of a sodium collecting tray 12. This sodium collecting tray 12 is to catch the sodium escaping from the double tank 3 in the event of a hypothetical accident and is therefore lined on the inside thereof with an insulating 13 which can, if need be, withstand the temperature of boiling sodium of approximately 880° C. The material reduces this temperature in the region of the sodium collecting tray 12 to a temperature of about 600° C which is permissible for steel. Below the bottom tray are disposed 6 numerous small diameter hollow hairpin tubes 14, which in the plan view are of involute-shape. One end of the tubes 14 are always connected to ring-shaped distribution pipes 15 and 23, respectively, and the other end to ring-shaped collecting tubes 16 and 22, respectively. For the hypothetical accident it is assumed that the space below the bottom tray 6 is filled with liquid sodium, so that adequate heat transfer from the bottom tray 6 to the hairpin tubes 14 is assured. The tubes are connected via a feed line 17 and a discharge line 18 to a heat exchanger, which is not specifically shown. The heat exchanger may, for example, be filled with a mixture of sodium and potassium which, in the event of the hypothetical accident, can give off an amount of heat to the ambiant air of about 4 MW. The bottom 10 is covered with heat-conducting granules 19 in order to protect it against direct contact with the hot sodium. The lower portion of the sodium collecting tray 12 up to the conical support 4 is also filled with these granules 19 in order to limit and control the heat transfer from the hot sodium to the lines 17 and 18 installed in this region and to ensure a continuous temperature profile between the bottom 10 and the sodium collecting tray 12.

In FIG. 2, numerous hairpin tubes 14, which are of smaller diameter than the surrounding pipes, are bent in the shape of involutes and are connected at one end to the ring-shaped collecting pipe 16. Their other ends are connected to a ring-shaped distribution pipe 15, which is located directly under the collecting pipe 16, as shown in FIG. 1. The entering coolant flows through the input line 17, through the distribution pipe at the bottom and from there, through all the parallel-connected, involute-shaped hairpin tubes 14 toward the center. The coolant is then deflected into a somewhat higher plane and returns through a like involute path to the upper collecting pipe 16 and flows through the output line 18 to a heat exchanger, not specifically shown. The return line from the center to the collecting pipe is positioned above the corresponding outgoing or feed line from the distribution pipe to the center. The ring-shaped collecting and distribution pipes 16 and 15 in this example are surrounded in the same respective plane by further collecting and distribution pipes 22 and 23, respectively, which are likewise connected by numerous, parallel-connected hairpin tubes 21 that are bent in the shape of involutes. The different groups of hairpin tubes 14 and 21 associated with different collecting and distribution pipes are alternately disposed, so that in the event of a failure of one pipe system, the heat can nevertheless be removed, and uniformly distributed over the circumference by a second parallel system.

FIG. 3 shows a portion of the ends of the hairpin tubes 14 and 21, bent in a U-shape, in the center of the cooling facility. Cross members 24, similarly bent in the shape of involutes, are disposed following each group of four hairpin tubes of involute-shape. By means of these cross members, the bottom tray 6, shown in FIG. 1, is supported on the bottom plate 10 of the sodium collecting tray 12. The hairpin tubes 14 and 21 rest on mountings 25 which are provided at spacings between adjacent cross members 24.

FIG. 4 diagrammatically shows a top view of the collecting pipes 16 and 22 with their respective discharge lines 18 and 26 which are formed in a spiral fashion alternating with each other outside the conical support 4. The supply lines to the distribution pipes have a like configuration. This configuration avoids thermal stresses and provides sufficient cooling surface at this point. The involute-shaped hairpin tubes disposed in the central area within conical support 4 are omitted in this illustration.

There are claimed

1. In a liquid metal-cooled nuclear reactor having a reactor vessel and a nuclear core received in the reactor vessel, a bottom tray disposed below the reactor vessel wherein the reactor core is received and serving as a receptacle for the reactor core upon melting thereof in the event of a hypothetical accident, and a cooler for the bottom tray comprising: at least one coolant distribution pipe and one collecting pipe disposed below the bottom tray at the circumference thereof, and a multiplicity of hairpin tubes connected in parallel and connecting said distribution and collecting pipes to one another, said tubes extending in radial direction equidistantly from one another and being in the shape of involutes running between the center and circumference of said tray.

2. The cooler of claim 1 wherein said distribution and collecting pipes are ring-shaped, the distribution pipe being in a plane below the collecting pipe, said tubes being disposed in a lower plane between the distribution pipe and the center and in an upper plane between the center and the collecting pipe.

3. The cooler of claim 2 wherein the return lines of said tubes between the center and said collecting pipe are positioned above a corresponding feed line between the distribution pipe and the center.

4. The cooler of claim 2 wherein said tubes are hollow and of smaller diameter than said pipes.

5. The cooler of claim 2 including support members disposed in spaces between adjacent tubes.

6. A cooler for a bottom tray of a liquid metal-cooled nuclear reactor, the tray serving as a receptacle for a melting reactor core in the event of a hypothetical accident, comprising at least two separate coolant collecting pipes and two separate coolant distribution pipes disposed below the bottom tray about the circumference thereof, the distribution pipes being in a plane below the collecting pipes, and a plurality of parallel connected tubes connecting said distribution and collecting pipes, said tubes being in the shape of involutes running between the center and circumference of said tray and being disposed in a lower plane between the distribution pipes and the center and in an upper plane between the center and the connecting pipes, said tubes being connected between associated pairs of collecting and distribution pipes in two parallel systems, the respective tubes of each system being alternately disposed about the circumference.

7. The cooler of claim 6 including separate supply and discharge lines respectively connected to said two separate collecting and distribution pipe systems, said supply and discharge lines being respectively disposed in alternating spiral paths outside the circumference of said tray.

* * * * *